United States Patent Office 3,439,028
Patented Apr. 15, 1969

3,439,028
PROCESS FOR PRODUCING α,β-UNSATURATED CARBOXYLIC ACID
Masaya Yanagita, Hoya-machi, Kitatama-gun, Tokyo, Masao Kitahara, Chiba-shi, and Takashi Mitsui, Nakameguro, Tokyo, Japan, assignors to Rikagaku Kenkyusho, Bunkyo-ku, Tokyo, Japan, a corporation of Japan
No Drawing. Filed Mar. 23, 1964, Ser. No. 354,147
Claims priority, application Japan, Apr. 3, 1963, 38/17,007; Sept. 17, 1963, 38/49,236
Int. Cl. C07c 51/24, 51/16
U.S. Cl. 260—530    8 Claims

ABSTRACT OF THE DISCLOSURE

α,β-Unsaturated carboxylic acid is prepared by reaction of α,β-unsaturated aldehyde in vapor phase with an oxygen containing gas at a temperature in the range 200–500° C., in the presence of a catalyst comprising a mixed complex of vanadium and molybdenum oxides, supported on aluminum sponge.

---

The present invention relates to a method for manufacturing α,β-unsaturated carboxylic acid by catalytic oxidation of α,β-unsaturated aldehyde in vapor phase. An object of the present invention is to manufacture α,β-unsaturated carboxylic acid economically and easily.

The formula of this reaction is as follows:

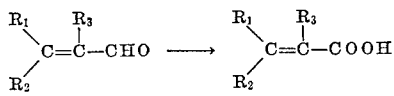

($R_1$, $R_2$, $R_3$ represent hydrogen and an alkyl group such as $CH_3$ and $C_2H_5$ respectively).

For example, acrylic acid is obtained from acrolein, methacrylic acid from methacrolein, and crotonic acid from crotonaldehyde.

In manufacturing α,β-unsaturated carboxylic acid by oxidizing α,β-unsaturated aldehyde, polymerization and other side reactions are liable to taking place at the same time since there exists a double bond adjacent to the aldehyde group. Further, it is relatively difficult to selectively oxidize the aldehyde group into α,β-unsaturated carboxylic acid.

This oxidation method has been tried by a lot of investigators for a long time and various oxidation methods have been suggested. However, any industrial and economical method of oxidation has not yet been established.

Of methods such as suggested, there is a method of oxidation by air or oxygen in the vapor phase in the presence of a metallic oxide catalyst (U.S. Patents 2,881,212–4, 3,021,366, 3,087,964, British Patent Nos. 878,802–3), a method of oxidation by air or oxygen in an organic solvent under the atmospheric or increased pressure and in the presence of a catalyst such as vanadic acid or the metallic salt of an organic acid (U.S. Patents 2,341,399, 2,397,891, J. Org. Chem., 26 (1961) 569–9), a method of oxidation by hydrogen peroxide in a tertiary butanol solvent in the presence of selenium dioxide (U.S. Patents 2,744,928–9, J. Org. Chem., 22 (1957) 746–8) and a method of oxidation by oxygen in an alkaline aqueous solution in the presence of metallic silver (U.S. Patents 2,930,801, 2,887,496).

Of these methods, the $H_2O_2$—$SeO_2$ oxidation method is quite interesting. By this method, a quantitative yield of α,β-unsaturated carboxylic acid can be practically obtained. However, this method has a defect in that $H_2O_2$ of a high concentration must be employed as an oxidizing agent so that it is difficult to put it into industrial practice.

A high yield may be expectedly obtained also in the oxidation method using metallic silver. In this method, however, there remain some problems in the life of the employed catalyst and in that α,β-unsaturated carboxylic acid is obtained in the form of an alkaline salt.

The other two methods are ones in which air or oxygen is employed as an oxidizing agent. Great interests have been concentrated upon the corresponding methods as the most economical oxidation methods, and the literature explains that these methods secure a high yield. In many cases, it is often difficult to reproduce said high yield even in tracing tests.

The inventor of the present invention has found that such difficult oxidation of α,β-unsaturated aldehyde can be easily carried out at a high yield by the vapor phase oxidation method. That is to say, α,β-unsaturated aldehyde can be quite easily oxidized into α,β-unsaturated carboxylic acid by the vapor phase oxidation, in the presence of a mixed complex catalyst composed of an oxygen compound of vanadium and molybdenum and in the co-presence of steam.

The present invention provides an advantageous method of oxidizing α,β-unsaturated aldehyde whose economical manufactuirng has been considered rather difficult.

The fact that an α,β-unsaturated carboxylic acid may be efficiently obtained from the corresponding unsaturated aldehyde by the vapor phase oxidation in accordance with the invention means that an α,β-unsaturated carboxylic acid may be obtained directly from an olefinic hydrocarbon in a single two-step process using two different catalysts as in the following formula. Therefore, any troublesome procedure for collecting α,β-unsaturated aldehyde as an intermediate product can be excluded and α,β-unsaturated carboxylic acid can be immediately separated from the resultant reaction gas by a quite simple operation such as cooling and washing. Consequently, α,β-unsaturated carboxylic acid can be industrially obtained at an extremely low cost.

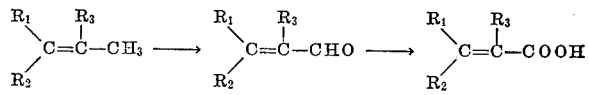

($R_1$, $R_2$, $R_3$ represent an alkyl group such as H, $CH_3$ or $C_2H_5$ respectively).

The present invention is illustrated below in detail, taking the case of manufacturing acrylic acid by oxidation of acrolein as an example.

Table I shows yields of acrylic acid in connection with catalysts in which vanadium oxide (as $V_2O_5$) and molybdenum oxide (as $MoO_3$) are blended with each other at various weight ratio on aluminum sponge as a carrier of the catalyst, said yields being obtained under following conditions: the quantity of the used catalyst 50 g.; acrolein 5.0 g./hr.; nitrogen 90 ml./min.; air 500 ml./min.; steam 1 liter/min.; the concentration of acrolein 2.0%; and the space velocity 1960 h.$^{-1}$.

TABLE I

| $MoO_3:V_2O_5$ ratio by weight | Optimum Reaction Temperature (° C.) | Conversion Rate (mol percent) | Yield of Acrylic Acid (mol percent) | Selectivity (mol percent) |
| --- | --- | --- | --- | --- |
| 100:10 | 420 | 87.8 | 28.6 | 32.5 |
| 100:33 | 360 | 91.3 | 40.4 | 44.2 |
| 100:50 | 300 | 89.8 | 52.0 | 57.8 |
| 100:100 | 305 | 100.0 | 66.9 | 66.9 |
| 100:200 | 240 | 65.2 | 34.6 | 53.0 |
| 100:300 | 220 | 63.0 | 29.7 | 47.1 |

As apparent from the above table, the equivalent mixture if $MoO_3$ and $V_2O_5$ brings about the most excellent result. In case the quantity of $V_2O_5$ becomes still larger under the given reaction conditions, the tendency of excessive oxidation gradually increases. On the other hand, if the quantity of $MoO_3$ becomes larger, then both the rate of yield of acrylic acid and the selectivity are reduced due to increase of the reaction temperature. When the reaction temperature is too high, it is found that decomposition and oxidation of acrylic acid produced tend to be remarkable.

In the present invention, it is desirable that the weight blending ratio of the catalyst components as a metallic oxide is in the range of $MoO_3:V_2O_5=100:10-300$ according to the results of said experiments.

The catalyst used in the present invention has a moderate activity as a catalyst for producing the $\alpha,\beta$-unsaturated carboxylic acid by oxidation of $\alpha,\beta$-unsaturated aldehyde. This catalyst also has a durability so that said activity is not reduced during use thereof. Further, this catalyst is very easy to prepare and the manufacturing cost thereof is low.

The raw materials of molybdenum oxide and vanadium oxide used as catalyst components are ammonium molybdate or water soluble molybdate and ammonium metavanadate or water-soluble vanadate, respectively.

As a carrier of the catalyst, there is mainly used aluminum sponge, electro-fused alumina or cinder. In addition to these, there may be used pumice stone, activated alumina, silicon carbide, silica gel and fire-proof stone which are generally used in a vapor phase oxidation of this kind. However, in comparison with a carrier having small surface area, such porous carriers generally have a poor effect. Of the above carriers, it is found that aluminum sponge gives the most effective result.

It is desirable that the particle size of the carrier is in the range of 4 to 20 mesh, preferably 4 to 10 mesh, in the case of the fixed bed type oxidation method, and 50 to 150 mesh in the case of the fluid bed type oxidation method. That is to say, selection of the particle size of the carrier depends upon the type of the oxidation method and any substantial difference of effect is not observed in the difference of the size.

It is preferable that the weight of the catalyst components combined to the carrier is usually 10 to 40 percent by weight.

As occasion arises, there may be added to the catalyst used in the present invention additional component of $P_2O_5$. The most excellent result is obtained by addition of a small quantity of $P_2O_5$. In this case, when the quantity of $P_2O_5$ used is too much, the reaction temperature is undesirably caused to rise. The quantity of $P_2O_5$ used is sufficient at the rate of 1 to 20 percent by weight to the total weight of $MoO_3$ and $V_2O_5$. Addition of the above additional component is made by addition of water soluble salt or oxide thereof.

When the vapor phase catalytic oxidation of the present invention is carried out, air is usually used as an oxidizing agent. In addition to this, there may be used air intensified by oxygen and air or oxygen diluted by nitrogen, carbonic acid gas or steam. In this case, there may be used as a diluent a lower hydrocarbon having 3 to 4 carbon atoms. The most desirable result is obtained when the molar ratio of oxygen to raw $\alpha,\beta$-unsaturated aldehyde is from 0.2 to 10.0, preferably 0.5 to 5.0. Use of excessive oxygen is not desirable since decomposition and oxidation of $\alpha,\beta$-unsaturated carboxylic acid produced by the reaction is accelerated, thereby to lower the purity of the product.

Addition of steam into reaction system is quite important in order to obtain smooth reaction and better selectivity. Addition of steam makes it easy to give the most proper catalytic reaction time. The quantity of steam added is 1 to 50 mol, preferably 5 to 30 mol per mol of $\alpha,\beta$-unsaturated aldehyde as material.

It is preferable that the concentration of $\alpha,\beta$-unsaturated aldehyde in a mixed gas is usually 1 to 10 percent although said amount of aldehyde can be changed in a wide range. Although the reaction temperature can be changed depending on the blending ratio of oxygen, the contact time and the concentration of $\alpha,\beta$-unsaturated aldehyde in a mixed gas, it is desirable that said temperature is usually in the range of 200° C. to 500° C., preferably 250° C. to 350° C. Further, it is desirable that the contact time is 0.1 to 5.0 seconds, preferably 0.2 to 2.0 seconds.

One example of the methods for preparing a catalyst used in the present invention is given below.

A hot aqueous solution containing ammonium molybdate and ammonium metavanadate and, if required, water soluble other ammonium salt is added to a substance serving as a carrier of the catalyst, and then stirred said mixture on a water bath, evaporated and dried. Subsequently, after sufficiently dried, the resultant product is charged into a reaction tower and calcined therein for about 50 hours at a temperature of 300 to 350° C., while blowing air into said tower. Then calcined product is screened to give the desired catalyst. In preparing the catalyst, metallic oxides itself can be used instead of the above salts.

In order to oxidize $\alpha,\beta$-unsaturated aldehyde by using the above-mentioned catalyst, said catalyst is charged into a reaction tower. A small amount of nitrogen gas is introduced into an evaporator (always kept at 20° C.) for raw $\alpha,\beta$-unsaturated aldehyde. This raw aldehyde is withdrawn together with the nitrogen. After mixed with air or oxygen, said raw aldehyde is led into the reaction tower from the upper thereof. On the other hand, a desired quantity of water is led by a pump to the evaporator arranged in the upper part of the reaction tower, evaporated therein at a moment and introduced into the reaction tower from the upper part thereof. Then, this steam is uniformly mixed with a mixed gas comprised of said raw aldehyde, nitrogen and air and passed through the catalyst layer.

Subsequently, the gaseous reaction products which oxidized by passing through the catalyst layer are iced or rinsed. Thus, the whole $\alpha,\beta$-unsaturated carboxylic acid produced by the reaction can be easily obtained in the form of an aqueous solution.

By analysis of the resulting products, the yields of $\alpha,\beta$-unsaturated carboxylic acid have been observed by a gas chromatography (GCIA type manufactured by Shimadzu Seisakusho, behenic acid-diethylhexyl sebacate: 0.75 m. column, He: 100 ml./min., temperature: 130° C., sample: $3\times10^{-3}$ ml., internal standard substance: methacrylic acid in the case of oxidation of acrolein).

Further, the purity and other properties of $\alpha,\beta$-unsaturated carboxylic acid have been examined. Thus, methyl ester of said carboxylic acid is synthesized and the gas chromatographic test (154C type manufactured by Perkin Elmer, polyethylene glycol: 2000–2 m. column, He: 50 ml./min., temperature: 100° C., sample: 3×10⁻³ ml., internal standard substance: benzene) thereof has been observed.

In respect to the analysis of unreacted raw α,β-unsaturated aldehyde, dissolved aldehyde by icing or rinsing is analyzed by the gas chromatography (internal standard substance: methylethyl ketone) while estimation of raw aldehyde in the waste gas is performed by the precipitation gravimetric analysis in which 2 N HCl saturated solution of 2.4 dinitrophenylhydrazine is used.

The respective definitions of the conversion, yield and selectivity of the product on the basis of raw α,β-unsaturated aldehyde are as follows:

Conversion Rate (%) =

$$\frac{\text{Carbon weight of } \alpha,\beta\text{-unsaturated aldehyde supplied} - \text{Carbon weight of } \alpha,\beta\text{-unsaturated aldehyde not reacted}}{\text{Carbon weight of } \alpha,\beta\text{-unsaturated aldehyde supplied}} \times 100$$

Yield (%) =

$$\frac{\text{Carbon weight of } \alpha,\beta\text{-unsaturated carboxylic acid produced}}{\text{Carbon weight of } \alpha,\beta\text{-unsaturated aldehyde supplied}} \times 100$$

Selectivity (%) =

$$\frac{\text{Carbon weight of } \alpha,\beta\text{-unsaturated carboxylic acid produced}}{\text{Carbon weight of } \alpha,\beta\text{-unsaturated aldehyde reacted}} \times 100$$

EXAMPLE 1

100 g. of aluminum sponge with a mesh of 6 to 10 is put on an evaporating dish. Then, 11.80 g. of ammonium metavanadate and 11.22 g. of ammonium molybdate respectively dissolved in about 200 ml. of hot water are gradually added to the evaporating dish, evaporated to dry while stirring, thus salts are adhered to said aluminum sponge. After sufficiently dried, the resultant product is charged into a reaction tower (composed of a steel pipe of inner diameter 1.65 cm. and a length 115 cm., heat-conducted by a nitre (salt bath) and heated by two Nichrome wires of 1 kw.) and then calcined by heating at a temperature of 300 to 350° C. for 50 hours, while air is passed at a rate of 4 liter/min. through said reaction tower. After calcining, the resultant product is taken out of the reaction tower and then screened by a sieve of 10 mesh. Thus, 116.8 g. of a catalyst is obtained.

The blending ratio by weight of metallic oxides in this catalyst is $MoO_3:V_2O_5=100:100$, the total weight thereof is 18.2 g. and the amount of said oxides adhered to the aluminum sponge is 15.4% of the total weight of the catalyst.

50 g. of thus prepared catalyst is charged into the reaction tower. Then, a mixed gas composed of 5.0 g./hr. of acrolein, 90 ml./min. of nitrogen, 500 ml./min. of air and 1 liter/min. of steam are introduced from the upper part of said reaction tower, passed through the catalyst layer. The gaseous reaction product which oxidized through the catalyst layer is then led to an iced condenser and quenched therein for the collection of condensable substances such as an acidic substance and water etc. A part of unreacted acrolein is also collected therein.

As a result of the reaction at a temperature of 305° C. for three hours, 10.04 g. (66.9%) of acrylic acid has been obtained from 15.0 g. of acrolein feed. In this reaction, the conversion rate of acrolein is 100% and the selectivity to acrylic acid, therefore, is 66.9%. In the acid composition, 10.6% of acetic acid and 0.8% of formic acid have been observed as products besides acrylic acid.

EXAMPLE 2

A mixed gas composed of 5.0 g./hr. of acrolein, 90 ml./min. of nitrogen, 350 ml./min. of air and 1 liter/min. of steam are introduced into a reaction tower from the upper part and passed through the layer of the same catalyst of 50 g. as in Example 1.

The relation between the yield of acrylic acid and the reaction temperature is shown in the following Table II.

TABLE II

| Reaction Temperature (° C.) | Conversion Rate (percent) | Yield of Acrylic Acid (percent) | Selectivity (percent) |
|---|---|---|---|
| 300 | 48.2 | 36.7 | 76.2 |
| 320 | 59.3 | 53.4 | 90.0 |
| 340 | 70.2 | 61.7 | 87.8 |
| 360 | 80.6 | 68.4 | 84.8 |

EXAMPLE 3

The same process as in Example 1 is repeated by using 50 g. of 6 to 10 mesh aluminum sponge, 1.18 g. of ammonium metavanadate and 11.22 g. of ammonium molybdate, 59.3 g. of a catalyst has been prepared. In this catalyst, the blending ratio by weight of metallic oxides is $MoO_3:V_2O_5=100:10$ and the hold weight thereof in the catalyst is 10 g.

50 g. of said catalyst is then charged into a reaction tower and a mixed gas composed of 7.8 g./hr. of methacrolein, 120 ml./min. of nitrogen, 500 ml./min. of air and 1 liter/min. of steam are passed therethrough.

As a result of reaction at a temperature of 380±5° C. for five hours, 12.2 g. of methacrylic acid is obtained from 39.0 g. of methacrolein, at a yield of 21.9%. In this reaction, the conversion rate of methacrolein is 32.1% and accordingly the selectivity thereof is 68.2%.

In the acid composition, 15.8% of acetic acid, 2.1% of formic acid and 1.8% of acrylic acid are observed as products besides methacrylic acid.

EXAMPLE 4

11.80 g. of ammonium metavanadate and 11.22 g. of ammonium molybdate are taken in a beaker and, 200 ml. of water is added thereto, and the mixture is heated and dissolved. Then, 3.0 g. of phosphoric acid with a specific gravity of 1.80 is taken in another beaker and diluted by 10 ml. of water. To this, 15 ml. of 28% ammonia water is added to prepare aqueous solution of ammonium phosphate. The later solution is then mixed to above described aqueous solution of metallic ammonium salt.

100 g. of a 6 to 10 mesh aluminum sponge is taken in an evaporating dish and then the above solution is added thereto. The resultant solution is stirred and heated over the water bath to evaporate water and to adhere each ammonium salts to the aluminum sponge respectively. After sufficiently dried over the water bath, the resultant product is charged into the reaction tower and treated therein in the same manner as in Example 1. Thus, 118.5 g. of a catalyst is obtained. The blending ratio by weight of metallic oxides in said catalyst is $MoO_3:V_2O_5:P_2O_5=100:100:20$ and the total weight thereof is 20.0 g. and the amount of said oxide adhered to the aluminum sponge is 16.7% of the total weight of the catalyst.

50 g. of thus prepared catalyst is charged into the reaction tower and a mixed gas composed of 5.0 g./hr. of acrolein, 90 ml./min. of nitrogen, 200 ml./min. of air and 1 liter/min. of steam are also fed into the reaction tower from the upper part thereof and passed through the catalyst layer. As a result of reaction at the temperature of 390 to 400° C. for five hours, 14.46 g. (45.0%) of acrylic acid is obtained from 25.0 g. of raw acrolein. In this reaction, the conversion rate of acrolein is 66.0% and accordingly the selectivity thereof to acrylic acid is 68.2%.

In the acid, 8.7% of acetic acid and 1.8% of formic acid are observed as products besides acrylic acid.

We claim:
1. A process for producing an α,β-unsaturated carboxylic acid, which is characterized by oxidizing in the vapor phase the corresponding α,β-unsaturated aldehyde with an oxygen-containing gas at a temperature of from 200 to 500° C., in the presence of a catalyst consisting of oxygen compounds of molybdenum and vanadium in the ratio by weight of molybdenum compound, expressed as $MoO_3$, to vanadium compound, expressed as $V_2O_5$, of $MoO_3:V_2O_5=100:10-300$, on a carrier of aluminum sponge, wherein said catalyst is prepared by depositing dry salts or oxides of molybdenum and vanadium upon aluminum sponge, and then calcining said supported catalyst in air at a temperature of 300–350° C.

2. A process according to claim 1, wherein the catalyst contains phosphorus pentoxide as an additional component in an amount of from 1 to 20% of the total weight of $MoO_3$ and $V_2O_5$.

3. A process according to claim 1 wherein molybdenum and vanadium salts are deposited on the aluminum sponge by evaporation from an aqueous solution of said salts.

4. A process according to claim 1, wherein the oxygen-containing gas is selected from the group consisting of air, oxygen, and each of said two gases diluted with an inert gas selected from the group consisting of nitrogen, carbonic acid gas, steam and lower hydrocarbon having 3 to 4 carbon atoms.

5. A process according to claim 1, wherein the oxidation is carried out in the presence of steam as a diluent.

6. A process according to claim 1, wherein the oxidation is carried out in the presence of a lower hydrocarbon having 3 to 4 carbon atoms as a diluent.

7. A process according to claim 1, wherein the α,β-unsaturated aldehyde with an oxygen-containing gas contains from 1 to 10% by volume of said α,β-unsaturated aldehyde, the molar ratio of oxygen/aldehyde is from 0.2 to 10.0, the molar ratio of steam/aldehyde is from 1 to 50, the reaction temperature is from 200 to 500° C., and the contact time is from 0.1 to 5.0 seconds.

8. A process according to claim 1, wherein the α,β-unsaturated aldehyde is selected from the group consisting of acrolein, methacrolein and crotonaldehyde.

References Cited
UNITED STATES PATENTS 3,087,964    4/1963    Koch et al.

FOREIGN PATENTS 903,034    8/1962    Great Britain.

LORRAINE A. WEINBERGER, *Primary Examiner.*

V. GARNER, *Assistant Examiner.*

U.S. Cl. X.R.

252—467; 260—533